UNITED STATES PATENT OFFICE.

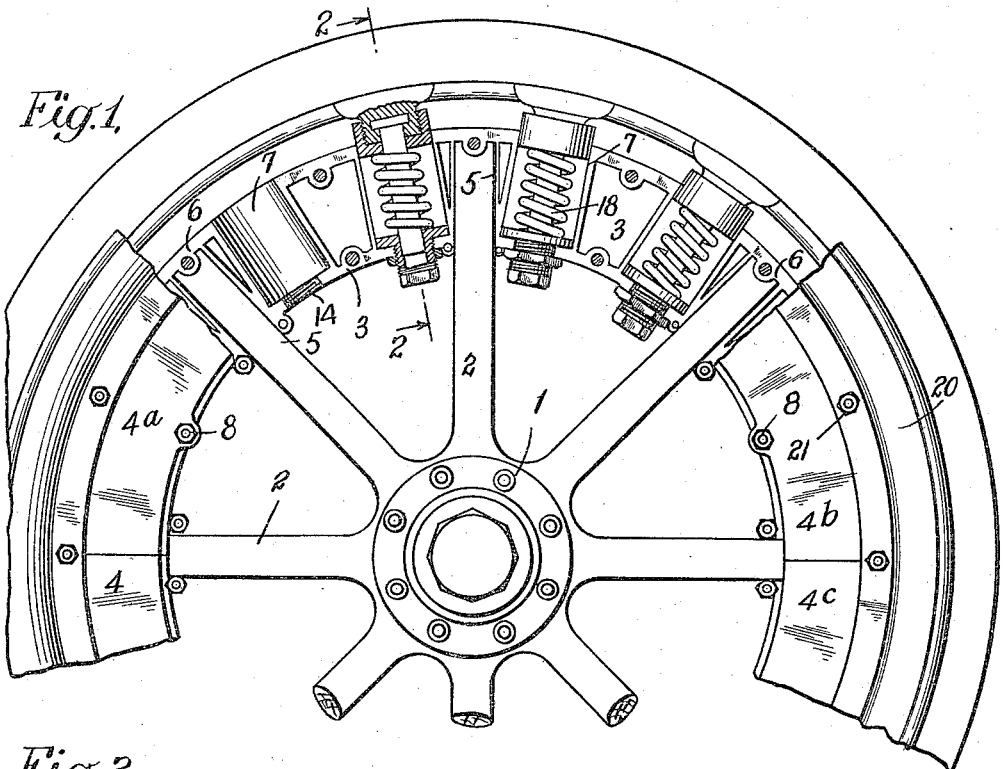
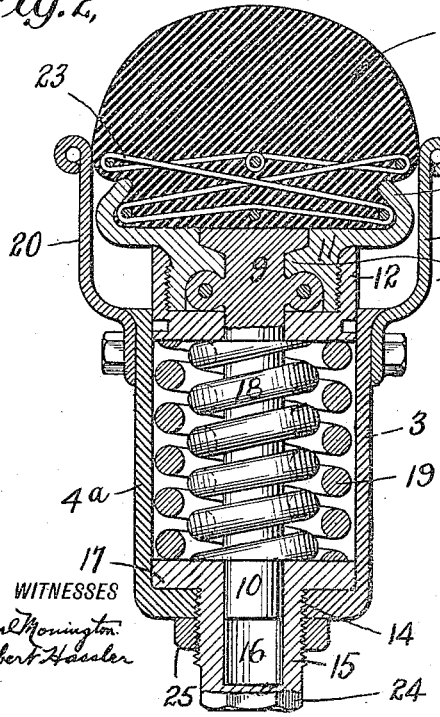
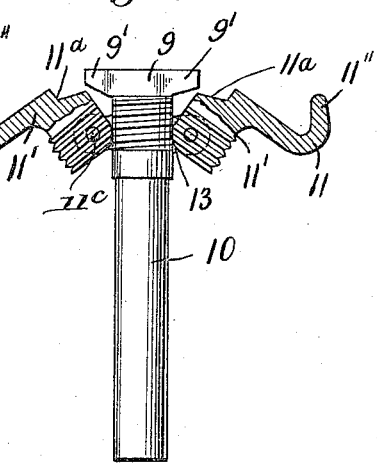

CHARLES VOLLMER, OF ROCKAWAY BEACH, NEW YORK.

RESILIENT WHEEL.

1,160,470.   Specification of Letters Patent.   Patented Nov. 16, 1915.

Application filed January 25, 1915. Serial No. 4,143.

*To all whom it may concern:*

Be it known that I, CHARLES VOLLMER, a citizen of the United States of America, and a resident of Rockaway Beach, county of Queens, State of New York, have invented certain new and useful Improvements in Resilient Wheels, of which the following is a specification.

My invention relates to vehicle wheels and particularly to the class of resilient wheels.

The object of my invention is to provide a wheel having a tire resiliently supported thereon for movement relative thereto, whereby shocks and blows delivered to the tire will not be transmitted to the wheel and the axle on which the wheel is mounted. I attain this object by forming the rim of a vehicle wheel of two rings having radial grooves in their faces, which form, when the rings are secured together so that the grooves register, a number of cylinders, certain of which open toward the center of the wheel to accommodate the spokes which radiate from the hub, and certain of which open toward the periphery of the rim to form air chambers to confine air and to inclose springs to support pistons or plungers, which in turn support and hold the tire upon the wheel. Guards are provided at each side of the rim, which coöperate with the tire to guide it as it moves relatively to the rim and to keep dust away from the pistons.

My invention further includes a simple arrangement of piston and tire grip, wherein two tire gripping members are pivoted to a core member and, after being swung to tire gripping position, are held immovable by the piston.

A particular advantage of my invention is that it may be applied to any wheel now in use or to new wheels.

Other objects and advantages will appear from the following description, taken in connection with the accompanying drawings, in which:—

Figure 1 is a partial side view of a wheel embodying my invention, parts of said wheel being broken away, and parts of the tire-supporting mechanism being shown in section; Fig. 2 is a section on the line 2—2 of Fig. 1; Fig. 3 is a detail view of the piston core with the tire grips pivoted thereto and the piston rod formed integral therewith.

The wheel is made up of a hub member 1, to which are attached in the usual manner spokes 2, which radiate therefrom. The rim is made up of the complete ring 3 and another exactly similar ring made up of the quarter sections 4, $4^a$, $4^b$ and $4^c$. Each ring has, at equal distances around its face, radial grooves 5, semi-circular in cross-section, so that, when the rings are placed face to face in such a position that these grooves are opposite and register with one another, cylindrical recesses are formed in which the spokes 2 are accommodated. These grooves do not extend to the outer edge of the rings, so that when the rings are placed together the recess has an outer end wall 6. In the faces of the rings there are also formed radial grooves 7, semi-circular in cross-section, which do not extend to the inner edges of the rings. These grooves, like the grooves 5, are at equal distances around the rings and are positioned in the same faces as the grooves 5, so that when the rings are held together by the bolts 8 circular cylinders are formed, into which fit the plungers which support the tire. Each plunger comprises a core member 9, a piston rod 10 extending therefrom and integral therewith, tire or traction member gripping members 11 and a piston member 12. The core member 9 has an elongated, flat-topped head, the ends of which are screwthreaded. On the sides of the core member are ears 13, to which are pivoted the tire gripping members 11. The tire gripping members comprise the body portion 11' and the hooked ends 11''. The cross-section of the body members 11' is a segment of a circle, and these body members, when swung into position alongside of the core member 9, form a circular body. The body members 11' are threaded, and the piston member, which is cup-shaped, having a hole therethrough to accommodate the piston rod, is screwed upon the body members and core member, thus holding the tire grips firmly in position.

Each core member 9 is provided with ears 13 positioned slightly below the shoulders 9' formed on the head of the core member. The body members 11' are provided with slots into which fit the ears 13. The pins $11^c$ pass through the body members and the ears, and portion 11ᵇ of each body member extends in between the ears and the shoulders 9' when the tire-gripping members are swung up to tire-gripping position, in which position they are held by the piston member 12, the shoulders 9' being accommodated by the recesses 11ᵃ in the body members 11'. It will be seen, therefore, that when the gripping members are in position and held up close to the core member all forces acting on the grips will be imparted to the core through the action of the portion 11ᵇ against the shoulders 9' and the ears 13.

The piston member is proportioned to fit snugly in the cylinders formed in the rim. In the inner walls of the cylinders which accommodate the plungers there is formed a threaded hole 14, through which extends a threaded cap 15, having a recess 16 in it. The piston rod 10 fits into this recess 16. In the bottom or inner end of the cylinders which accommodate the plungers there is a false bottom 17, which is attached to or integral with the cap 15. Between the false bottom and the piston member, and surrounding the piston rod, there is a helical spring 18. There may also be a second helical spring 19 surrounding spring 18, according to how great a support is desired for the plungers.

Around the edges of the rim there are attached continuous guard and guide rings 20. These rings are attached by the bolts 21.

Held within the tire grips 11 and resting on the core members 9, is a continuous elastic tire or traction member 22. It is to be understood that while a continuous tire is shown and described I do not wish to confine my invention to such a form of traction member, but wish it to be understood that the tire or traction member grips 11 may hold individual traction members. The elastic tire 22 is reinforced by metallic reinforcing members 23 against lateral expansion, and the guides 20 contact with the sides of the tire, so that the coöperation of the tire and the tire guide produces a closure for the groove formed by the tire guides and the rim, in which are placed the piston members 12. This arrangement prevents dust and other foreign matter from interfering with the operation of the pistons. The tire, being reinforced against lateral expansion, will not bind in the guide and deform it.

The ring comprising the parts 4, 4ᵃ, 4ᵇ and 4ᶜ is made in sections for the purpose of convenience, so that any plunger and its supporting springs may be replaced without taking the whole wheel to pieces. This ring, however, may be made in a single piece.

In assembling this wheel, the tire gripping members are closed around the beads of the tire and the piston members screwed part way onto the body members 11' of the tire grips. The springs are then put on the piston rods and the false bottoms are slid over the piston rods, the tire is placed alongside of the ring 3 and the plungers slid along the tire to their proper positions and pushed into the cylinders provided for them. The sections 4, 4ᵃ, 4ᵇ and 4ᶜ are then placed over the ring 3 and the plungers resting in the grooves therein and bolted to the ring 3. The caps 15 are provided with a wrench head 24, and, by rotation of these caps, the false bottoms 17 are moved radially outward and the pressure of the springs 18 and 19 upon the piston members is increased. This adjustment makes it possible to have the outward pressure on all parts of the tire uniform. A lock member 25, which is screwed onto the threaded part of the cap 15, is tightened up against the rim to hold the cap members 15 in adjusted position.

While I have described a specific embodiment of my invention, I do not desire or intend that I shall be confined to the device disclosed, but that my invention may be embodied in any device which is defined by the appended claims.

What I claim and desire to secure by Letters Patent of the United States is:—

1. In a vehicle wheel, a hub, spokes secured to and radiating therefrom, a rim for said wheel supported on said spokes and having radial recesses therein opening outwardly, false bottoms for said recesses, said false bottoms and the inner walls of said recesses being provided with openings, pistons closely fitting said recesses, piston rods for said pistons extending through said openings, springs in said recesses supporting said pistons and resting on said false bottoms, a continuous tire encircling said wheel and supported by said pistons, means adjustably positioned in and closing the openings in the inner walls of the recesses for supporting said false bottoms.

2. In a vehicle wheel, a rim having outwardly-opening recesses, core members in said recesses, a traction member supported by said core members, traction member grips for said traction member, and piston members fitting within said recesses fixing said grips relatively to said core members.

3. In a vehicle wheel, a rim having outwardly-opening recesses, core members in in said recesses, a traction member supported by said core members, traction member grips for said traction member, piston members fitting within said recesses fixing said grips relatively to said core members, said recesses having openings in their inner ends, and piston rods fixed relatively to said piston members and passing into said openings.

4. In a vehicle wheel, a rim having outwardly-opening recesses, core members in said recesses, a traction member supported on said cores, traction member grips pivoted to said core members to swing into gripping position, and piston members fixing said grips relatively to said core members.

5. In combination, a vehicle wheel, means for supporting a traction member thereon, comprising core members supported on said wheel, traction member grips pivoted to said core members to swing into gripping position, means for holding said grips in said position, and means for preventing relative movement of said grips and cores due to forces acting on said traction member.

6. In combination, a vehicle wheel, means for supporting a traction member thereon, comprising core members supported on said wheel, traction member grips pivoted to said core members to be swung into traction member gripping position, and means for holding said grips in said gripping position.

7. In combination, a vehicle wheel, means for supporting a traction member thereon, comprising core members supported on said wheel, traction member grips pivoted to said core members to be swung into traction member gripping position, and devices for holding said grips in said gripping position and having means making engagement with said grips and cores and securing them against relative movement.

8. In combination, a vehicle wheel, means for supporting a traction member thereon, comprising core members supported on said wheel, traction member grips, parts of said grips and core members being shaped to form a cylindrical portion when placed together, said portion being threaded and a ring screwed onto said parts whereby said grips and core members are held against relative movement in every direction.

9. In combination, a vehicle wheel, means for supporting a traction member thereon, comprising core members supported on said wheel and provided with lugs, traction member grips pivoted to said core member to be swung into traction member gripping position, a ring for holding said grips in said gripping position, and lugs on said grips coöperating with said lugs on said core members to hold said cores and grips against relative slippage.

10. In a vehicle wheel, a hub, spokes attached to and radiating from said hub, a rim comprising a solid ring and a sectional ring each having radial grooves extending part way across their faces and certain of said grooves extending from the inner edge of the ring and others extending from the outer edge of the ring, said rings being secured together with like grooves registering, whereby radial recesses are formed, said spokes being accommodated by said inwardly-opening recesses and traction member supporting devices accommodated by said outwardly-opening recesses.

11. In a vehicle wheel, a hub, spokes secured to and radiating therefrom, a rim for said wheel supported on said spokes and having radial recesses therein opening outwardly, false bottoms for said recesses, said false bottoms and the inner walls of said recesses being provided with openings, pistons closely fitting said recesses, piston rods for said pistons extending through said openings, springs in said recesses supporting said pistons and resting on said false bottoms, a continuous tire encircling said wheel and supported by said pistons, said false bottoms being provided with members for covering the openings therein, said members being adjustably secured in the openings in the inner walls of the recesses.

In testimony whereof, I have signed my name to this specification, in the presence of two subscribing witnesses.

CHARLES VOLLMER.

Witnesses:
E. F. BAUMGARTEN,
A. PSCHIERER.

Copies of this patent may be obtained for five cents each, by addressing the "Commissioner of Patents, Washington, D. C."